UNITED STATES PATENT OFFICE.

HENRY HICKS HURT, OF NEW YORK, N. Y.

WATERPROOFING MATERIAL AND PROCESS FOR MAKING THE SAME.

1,400,164.　　　　　Specification of Letters Patent.　　Patented Dec. 13, 1921.

No Drawing.　　Application filed November 27, 1918. Serial No. 264,442.

*To all whom it may concern:*

Be it known that I, HENRY HICKS HURT, a citizen of the United States, and resident of New York city, in the county of New York and State of New York, have invented certain new and useful Improvements in Waterproofing Materials and Processes for Making the Same, of which the following is a specification.

It has been known to utilize sulfite waste liquor one form of which is described in the patent to Robeson, No. 833,634, March 12, 1906 and known under the commercial name of "glutrin", as a binding material and as a tannin extract. As illustration of such use it is incorporated in sand cores in foundry practice, in the formation of briquets, as a binding material for roads disclosed in the patent to Robeson, No, 1,069,029, July 29, 1913 and to form plastic clayey compositions such as is disclosed in the patent to Robeson, No. 1,069,031, July 29, 1913. These binding materials and extracts are not waterproof and this seriously detracts from their commercial value in that the resulting structures bound by this material absorb water with a resulting tendency to become pasty and eventually to disintegrate.

Accordingly, the primary object of the invention is to provide a simplified and commercially practical means for rendering this sulfite waste liquor material waterproof without impairing its efficiency as a binding material.

It has been suggested to combine rosin with caustic soda and add the resulting soapy composition to the sulfite waste liquor. This process, however, does not work efficiently in that the waterproofing of the binding material is not materially improved. As an improvement over this suggestion the present disclosure features the introduction of the rosin, or preferably linseed oil, into chemical combination with the caustic soda while the latter is in contact with the waste liquor. It is the present belief that the rosin or linseed oil in its reaction with the caustic soda can combine with the sulfite waste liquor while in a nascent state and this combination is difficult, if not impossible, after the reaction has been completed.

As an example of one process which has worked effectively in producing a binding material substantially waterproof, the following steps are practised:—

(a) The sufite waste liquor is treated with a re-agent to remove all or practically all of the contained lime.

This may be attained by treating the liquor with sulfuric acid or preferably with sodium bi-sulfate. The use of the sodium salt is preferable for its use does not necessitate the relatively large amount of caustic soda necessary in the following neutralizing step when the strong acid is used.

(b) The precipitate containing lime as sulfate is filtered off as by means of a filter-press.

(c) The filtrate is neutralized with an alkali, preferably caustic soda.

(d) To the neutralized substance is added a solution of caustic soda in an amount depending upon the desired reaction and condition of the re-agents, for example in the proportion of six (6) parts by weight of caustic soda to one hundred (100) parts by weight of the soda base material.

There is thus formed a solvent for the material added by the next step and this solvent is heated to insure its homogeneity.

(e) To the hot solvent is added a substance which is saponifiable with caustic soda, one such substance being rosin as previously suggested, but linseed-oil has preference in those situations where the high price of linseed-oil is not objectionable. However, it is to be understood that other substances are equally applicable and in the following claims the term "linseed-oil" is to be understood to include any equivalent substance, such as rosin, corn oil, china nut oil which will saponify with soda. The linseed-oil is added in the proportion of fifty (50) parts of the oil to one hundred and six (106) parts of the oil solvent. The linseed-oil or rosin unites with the soda and simultaneously unites also with the sulfite liquor filtrate to form a solution which can be diluted with water in all proportions and which on drying forms a waterproof binder.

(f) Preferably and prior to the formation of the water solution the saponified substance is treated with a re-agent capable of setting the linseed-oil or rosin free.

One such substance which has been used satisfactorily is aluminum sulfate but certain acids, such for instance, as sulfuric acid can be used. The aluminum sulfate is dissolved in hot water in the proportion of fourteen (14) parts by weight of the sulfate to one hundred and fifty (150) parts of the mixture.

The material can be marketed and used as binding materials are used at present. The use of this waterproof substance as a filler in the tannin treatment of leather and the like has been suggested.

Having thus described my invention, I claim:—

1. The process of preparing a substantially waterproofing material which comprises treating a sulfite waste liquor with a re-agent to precipitate therefrom the contained lime, filtering, neutralizing the filtrate, adding caustic soda to the neutralized filtrate and then adding to the solution thus formed a substance capable of saponification with the sodium compound.

2. The process of preparing a substantially waterproofing material which comprises treating a sulfite waste liquor with a re-agent to precipitate therefrom the contained lime, filtering, neutralizing the filtrate, adding caustic soda to the neutralized filtrate, adding to the solution thus formed a substance capable of saponifying with the sodium compound and adding to the saponified mass a re-agent capable of setting free the said saponified substance.

3. In the art of forming a waterproofing material, the process which comprises treating sulfite waste liquid with a re-agent to precipitate therefrom the contained lime, neutralizing the filtrate and then adding caustic soda to the neutralized filtrate to form a solvent for linseed oil.

4. The process of preparing a substantially waterproofing material which comprises treating a sulfite waste liquor with a re-agent to precipitate therefrom the contained lime, filtering, neutralizing the filtrate with an excess of caustic soda to form a linseed oil solvent and adding linseed oil to the solvent whereby the linseed oil will react with the excess of caustic soda in the presence of the sulfite waste liquor.

5. The process of preparing a waterproofing material which comprises the treating of a lime-free sulfite waste liquor with caustic soda in the presence of a substance which will saponify with caustic soda.

6. The process of preparing a waterproofing substance which comprises treating a lime-free sulfite waste liquor with linseed oil under conditions capable of forming a saponifying reaction while in intimate physical and chemical association with the waste liquor.

7. In the art of forming a substantially waterproof binding material, the process which comprises subjecting a neutral sulfite waste liquid free from lime to the action of linseed oil under conditions which will cause the linseed oil to react with the liquor.

8. A composition of matter containing a neutral sulfite waste liquor free from lime and the soap resulting from the saponification of linseed oil with caustic soda.

9. A composition of matter containing insoluble soap and sodium sulfate with sulfite waste liquor free from lime.

10. A composition of matter containing a neutral sulfite waste liquor free from lime and in which free caustic soda has been saponified with linseed oil in the presence of the sulfite waste liquor.

Signed at New York, in the county of New York and State of New York this 23rd day of November A. D. 1918.

HENRY HICKS HURT.